United States Patent [19]
Patel

[11] 3,850,276
[45] Nov. 26, 1974

[54] DELAYED ACTION TORQUE CONTROLLED CENTRIFUGAL CLUTCH

[75] Inventor: Kiritkumar R. Patel, Brooklyn, Ohio

[73] Assignee: Eaton Corporation, Cleveland, Ohio

[22] Filed: Feb. 28, 1973

[21] Appl. No.: 336,661

[52] U.S. Cl. ...... 192/105 BA, 192/109 D, 188/298, 188/321
[51] Int. Cl. ............................................ F16d 43/14
[58] Field of Search ..... 192/109 D, 109 A, 105 BA, 192/105 CD, 105 CE, 105 F, 105 A, 52

[56] References Cited
UNITED STATES PATENTS

| | | | |
|---|---|---|---|
| 1,374,413 | 4/1921 | Webb | 192/109 D X |
| 2,338,476 | 1/1944 | Wittkop | 192/105 BA |
| 2,915,159 | 12/1959 | Gubelmann | 192/105 CE |
| 3,017,005 | 1/1962 | Muhlbeyer | 192/105 BA |
| 3,353,641 | 11/1967 | Chana | 192/109 A |

FOREIGN PATENTS OR APPLICATIONS

| | | | |
|---|---|---|---|
| 101,740 | 2/1899 | Germany | 192/105 F |

*Primary Examiner*—Benjamin W. Wyche
*Attorney, Agent, or Firm*—Teagno & Toddy

[57] ABSTRACT

A delayed-action, frictionally-engageable drive mechanism having torque control means providing gradual driving engagement between the drive and driven members. The drive mechanism is of the type requiring movement of a locking member against the time adjustable bias of a fluid displacing dashpot before frictional engagement occurs between the driving and driven members. The torque control comprises a resilient cushion interposed between the locking member and dashpot which cushion is compressed by the locking member as the drive and driven members initially move into contact with one another. Following initial contact, the resilient material expands and further displaces the dashpot resulting in output torque between the drive and driven members in proportion to the expansion of the resilient cushion.

In accordance with another aspect of the invention, an adjustable stop in the dashpot prevents the resilient cushion from expanding beyond a predetermined point to control the total output torque between the drive and driven members.

3 Claims, 4 Drawing Figures

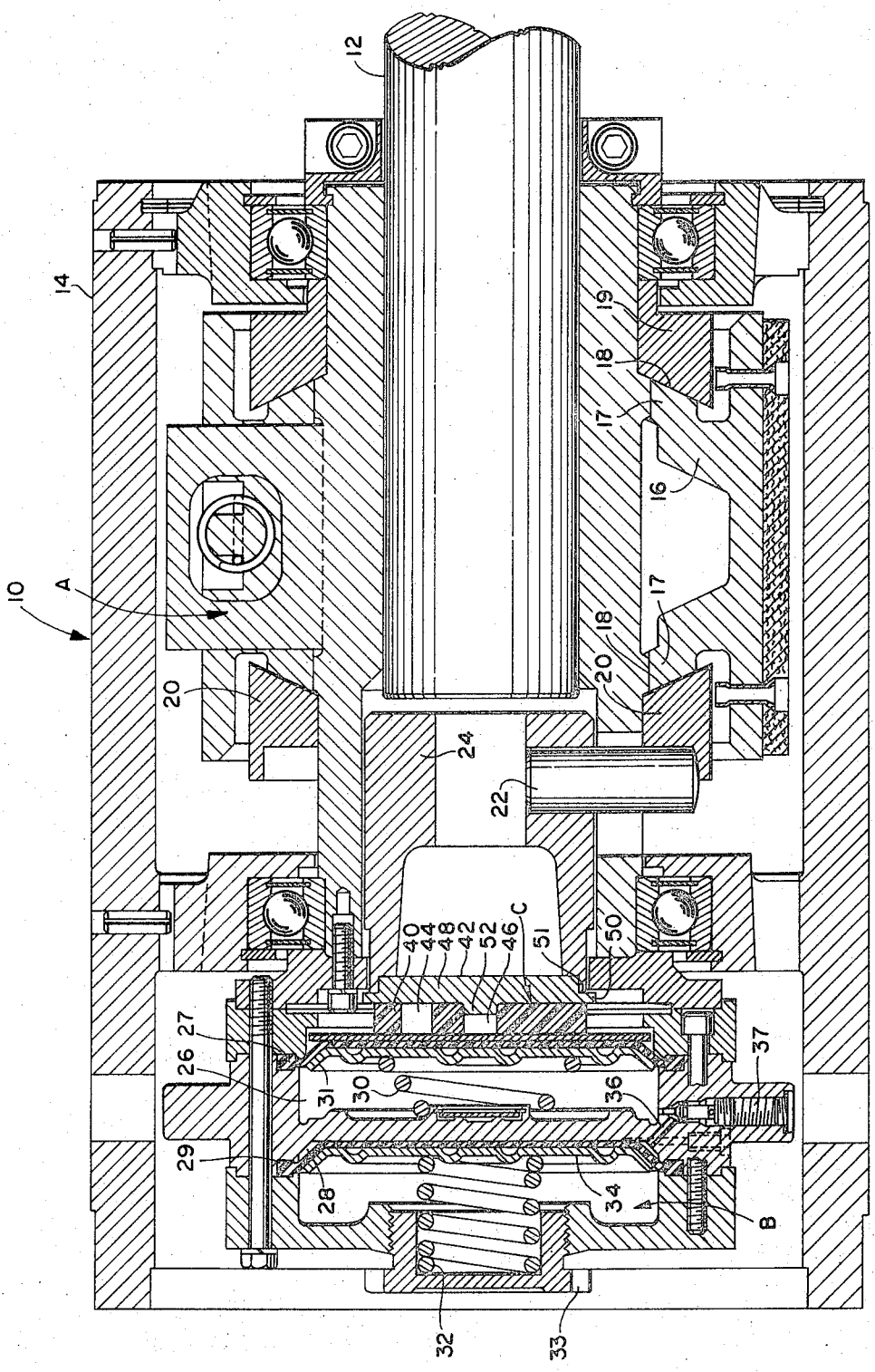

DELAYED ACTION TORQUE CONTROLLED CENTRIFUGAL CLUTCH

This invention relates to delayed-action drive mechanisms and more particularly to a torque control means for delayed-action centrifugal clutches, brakes and the like.

The invention is particularly applicable to a drive engagement means for regulating the torque of a delayed-action centrifugal clutch and will be described with particular reference thereto. However it will be appreciated that the invention has broader aspects and can be applied to regulate the torque of any delayed-action driving mechanism which must displace a resiliently deformable member before frictional engagement occurs between the driving and driven members.

Delayed-action centrifugal clutches of the type, particularly applicable to this invention, are described in U.S. Pat. Nos. 2,720,300 and 3,017,005. Clutches of this type utilize the centrifugal force of flyweights rotated by the driving member to axially displace a locking member against the bias of a fluid-metered dashpot. By controlling the metering of the fluid in the dashpot, the radially-outwardly movement of the flyweights into engagement with the driven member is controlled or delayed. However, once the flyweights contact the driven member instantaneous torque is applied because the dashpot is no longer compressed and thus cannot assert a biasing force against the flyweights. Application of an instantaneous start-up torque renders such delayed-action centrifugal clutches unsuitable for many high inertia drive applications, such as that of a belt conveyor.

Further, clutches of the above-described type do not possess any means of controlling the torque of the output member and the output torque thus developed is a direct function of the speed and weight of the flyweights. Recognizing this limitation, the prior art attempted to modify such clutches to provide some form of an adjustable spring biasing force which would control the output torque developed by the clutch. However, such arrangements have an extremely limited torque range and are generally ineffective. Conventional helically-wound springs were applied to the dashpot to produce a biasing force against movement of the dashpot diaphragm. The spring force thus opposed the centrifugal force of the flyweight transmitted to the dashpot via the locking member and, in effect, reduced the torque by a value proportional to the reduction in centrifugal force. However, space limitations control the practical size of helically-wound springs that can be employed in the centrifugal clutch and thus the force developed by the spring has been found not sufficient to control even 3 percent of the torque produced. Also the centrifugal clutch could become inoperative if the spring were inadvertently adjusted to travel solid before engagement occurs between the driving and driven members. Further the problems associated with utilizing a spring to effectively control the driving torque is not entirely dictated by space limitations as it has been found that other spring arrangements such as Belleville or leaf springs could be employed to increase the effectiveness of the torque control. However such spring arrangements are characterized in that they prove to be an effectively solid load-carrying member which transmit even slight axial and radial vibrations to load-carrying parts within the clutch mechanism producing excessive wear thereon, especially causing rupture of the diaphragm in the dashpot.

It is thus a principal object of this invention to provide torque controlling means which permit a gradual application of torque in a centrifugal clutch during start-up while also possessing a capability for controlling the driving torque of the output member.

In accordance with the invention there is provided a centrifugal clutch comprising an input shaft, an output shell and flyweights secured for common rotation with the input shaft and arranged to move radially-outwardly under centrifugal force to frictionally engage the output shell. A cammed locking member interposed a fluid-metered dashpot and the flyweights is axially displaced toward the dashpot upon radial movement of the flyweights to control metering of the fluid within the dashpot thus causing a delayed engagement between the flyweights and the output shell. Interposed between the dashpot diaphragm and the locking member is a torque controlling cushion of resilient material. The resilient material is compressed by the axial movement of the locking member as the flyweights travel radially-outwardly and some portion of the axial movement also absorbed by the dashpot to retain delayed-action clutch characteristics. When the flyweights initially contact the output shell, the force transmitted by the locking member to the flyweights as a result of the resilient cushion being in a compressed position is now gradually reduced and torque correspondingly increased as the resilient cushion expands to its initial position against the fluidic resistance of the dashpot.

In accordance with another aspect of the invention, an adjustable solid stop placed on one side of the dashpot diaphragm limits total movement of the diaphragm unit. Thus the resilient cushion cannot expand to its initial position from its compressed position and a predetermined driving torque of the output shell is obtained.

It is thus an object of the invention to provide in a time-delayed, frictionally-engaged drive mechanism, new and improved torque control means to provide a gradual torque engagement of the driven member upon start-up of the drive mechanism.

It is another object of the invention to provide in a time-delayed, frictionally-engaged drive mechanism, torque means controlling the output torque of the driven member.

Still yet another object of the invention is to provide a cushion means within a centrifugal clutch to absorb impacts and vibrations between mating parts and thus minimize wear on same.

A still further object of the invention is to provide in a centrifugal clutch, torque controlling means which increase lining life while not substantially increasing the cost of such clutch.

The invention may take physical form in certain parts and arrangement of parts a preferred embodiment of which will be described in detail herein and illustrated in the accompanying drawings which form a part hereof and wherein:

FIG. 3 is a top view of the resilient cushion; and

Figures 1, 2:
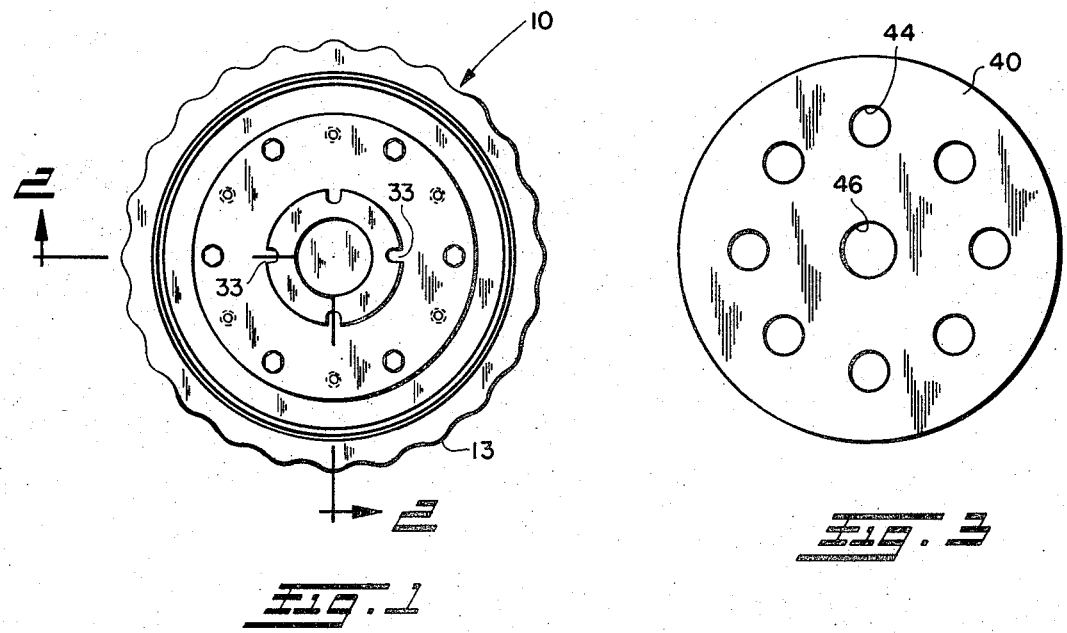
FIG. 1 is an end view of a centrifugal clutch.
FIG. 2 is a sectional view taken along Line 2—2 of FIG. 1.

Referring now to the drawings wherein the showings are for the purpose of illustrating a preferred embodiment of the invention only and not for the purpose of limiting the same, there is shown in FIGS. 1 and 2 a delayed-action centrifugal clutch 10, the term "clutch" being used as a descriptive term rather than a limiting term and intended to include those devices commonly known as "brakes" wherein the "output" member is rotationally fixed. Clutch 10 is shown as comprising an input shaft 12, an output shell 14 and a flyweight arrangement A connected to input shaft 12 and adapted to move radially-outwardly to drivingly engage output shell 14. Operatively connected to the flyweight arrangement A is a dashpot arrangement B which partly controls the rate of radial movement of flyweight arrangement A. Operatively connected between the flyweight arrangement A and dashpot arrangement B are torque controlling means C which regulate the torque transmitted from flyweight arrangement A to the output shell 14.

The delayed-action centrifugal clutch mechanism of the present invention is well known in the power transmission art and may be appreciated in further detail than will be described below by reference to Muhlbeyer's U.S. Pat. Nos. 2,720,300 and 3,017,005 and by reference to my co-pending application entitled "Centrifugal Clutch," Ser. No. 267,332, now U.S. Pat. No. 3,812,944, filed June 29, 1972 and assigned to the present assignee which shows a clutch structure similar to that described and shown herein.

Briefly, clutch 10 comprises an input shaft 12 which is keyed to a flyweight arrangement A. Flyweight arrangement A comprises in part at least two flyweights 16 having inwardly tapering surfaces 17 which engage outwardly-tapering surfaces 18 formed in axially-fixed cam 19 and axially-movable cam ring 20 to define a dovetailed joint. Axially-movable cam ring 20 engages pressure pins 22 which in turn are fixed to an axially-movable pressure sleeve or piston 24. In prior art centrifugal clutches, pressure sleeve 24 abuts against dashpot arrangement B.

Dashpot arrangement B is shown to be of the conventional type and comprises a first, normally-filled, variable-volume fluid chamber 26 and a second, normally-collapsed, variable-volume displaced fluid receiving chamber 28. The chambers 26, 28 each have one wall thereof defined by flexible diaphragms 27 and 29 respectively, which by axial movements thereof, may change the fluid-holding capacity of the respective chambers. The first chamber 26 is biased by the action of spring 30 acting upon the disc 31 which, in turn, presses upon flexible diaphragm 27 to place first chamber 26 in a maximum volume condition. The second chamber 28 is biased by the action of second spring 32 which is shown to be adjustable by a control knob 33 at one end with its other end acting upon disc 34 which, in turn, presses against the second flexible diaphragm 29 moving diaphragm 29 to a position whereat the second chamber 28 is collapsed or in a minimum fluid-holding volume condition. First and second chambers communicate with one another via passage 36; the flow through which is regulated by a conventional needle valve 37 or the like.

As thus described, the centrifugal clutch 10 will operate in a conventional manner in that rotation of the input shaft 12 will generate a centrifugal force forcing the flyweights 16 radially-outwardly; the movement being controlled by the metering of the fluid from the first chamber 26 into the second chamber 28 as the axially-movable cam ring 20 and pressure sleeve 24 displace the first diaphragm 27. It should be clear that once the friction material of the flyweights 16 engage the output shell 14 which is shown as scalloped 13 over its exterior surface for application to a belt conveyor arrangement, further radial movement of the flyweight arrangement A and correspondingly axial movement of dashpot arrangement B ceases. This results in a pressure drop of the fluid within the first chamber 26. As no further forces are transmitted to the dovetail portion 17 of flyweight arrangement A from the dashpot arrangement B the centrifugal force the flyweights 16 is instantaneously applied to the output shell 14.

To avoid instantaneous torque application, torque control means C are interposed between flyweight and dashpot arrangements A, B. More specifically a two-stage resilient cushion 40 comprised of such resilient material as natural rubber or polyurethane is placed with one end abutting the pressure plate before the first diaphragm 27 in the dashpot arrangement B. Secured to the other end of resilient cushion 40 is a compressive or backing plate 42 which abuts the pressure sleeve 24.

In the embodiment illustrated, resilient cushion 40 is circular in shape having a plurality of circumferentially-spaced holes 44 and a centrally-located guide hole 46 of diameter greater than that of holes 44 extending therethrough. The number of holes 44 serve as a convenient way to accurately fix the spring rate deflection characteristics of resilient cushion 40. In this regard it should also be noted that the outer diameter of resilient cushion 40 is predetermined so that the resilient cushion when compressed imposes a substantial uniform load upon the first diaphragm 27 and disc 31. Additionally the size and spacing of holes 44 and guide hole 46 are predetermined to provide controlled areas of flow for the resilient material when resilient cushion 40 is compressed. Importantly, these controlled flow areas are determined to provide uniform bearing of cushion 40 against dashpot arrangement B when cushion 40 is compressed. Other resilient cushion configurations will be apparent to those skilled in the art.

Backing plate 42 is also shown as circular in shape and has a relatively thick section 48 of diameter approximately equal that of the resilient cushion's outer diameter in an undeformed state and a relatively thin annular flange portion 50 extending from its thick section 48. The intersection between the annular flange 50 and thick section 48 defines a step 51 which is similarly formed in the pressure sleeve 24 to thus provide a positive stop preventing displacement of the backing plate 42 with respect to the pressure sleeve 24. A central boss 52 appends from the end of backing plate 42 which abuts against the resilient cushion 40 and has a diameter approximately equal that of the guide hole 46 and resilient cushion 40. Boss 52 thus maintains the resilient cushion 40 in a centered relation when the cushion 40 and backing plate 42 are assembled in clutch 10 and may also serve as a solid stop limiting the travel of resilient cushion 40 in the event that the cushion becomes "soft" from wear, fatigue, failure, etc.

OPERATION

Referring now in greater detail to the operation of clutch 10, it is apparent that rotation of the input shaft 12 at a constant speed produces a centrifugal force on the flyweights 16 which is effectively constant when the flyweights are in either a retracted or expanded position. Slack tolerances, wear, deflection, etc. in the arrangement permit the flyweights 16 to move outwardly some distance before the tapering surfaces 17 transmit an appreciable centrifugal force through the axially-movable cam ring 20 to the resilient cushion 40 and dashpot arrangement A. At this instant the force transmitted is in the nature of an impact load which compresses the resilient cushion from its assembled, precompressed first position before the dashpot arrangement A has had time to be displaced by virtue of its metering any fluid from its first chamber 26 to its second chamber 28. The resilient cushion thus effectively absorbs the energy of the centrifugal impact force. Following the initial force application, the centrifugal force becomes, what may be viewed as a static force, which displaces fluid in the dashpot arrangement while slightly decreasing the compression of the resilient cushion 40. When the flyweights 16 move into initial contact or engagement with the output shell 12 the resilient cushion 40 has now been deformed into its compressed or second position and the dashpot arrangement B has been displaced from its first initial position to a second displaced position. In the embodiment described, optimum torque engaging conditions were found when the travel of the dashpot arrangement B and the compression of the resilient cushion 40 constituted 10–20 percent and 80–90 percent of the total travel respectively at this instant.

When the flyweight's lining initially contact the output shell 12, the energy stored in the resilient cushion 40 exerts a biasing force tending to displace the dashpot arrangement A while also opposing the centrifugal force of the flyweights 16 via the cammed locking ring 20 to correspondingly reduce the output torque. It is appreciated that the cushion force opposing the centrifugal force is a function of the angular construction of the dovetailed joints between flyweights 16 and locking ring 20 and can be varied accordingly. In time, the dashpot arrangement will be further displaced until it reaches its third displaced position while the resilient cushion expands to its first precompressed position. Thus the cushion force opposing the centrifugal force will diminish accordingly and the output torque will be correspondingly increased as the linings of the flyweights increase their load transfer to the output shell 12.

Prior art devices without a resilient cushion 40 operate in an entirely dissimilar manner. Thus the "impact" or "shock" force of the flyweights is directly transmitted to the dashpot arrangement B, which among other things, results in the uneven deformation or ballooning of the diaphragm 27 in the first pressure chamber 26 in turn effecting the rate of metered flow. When the flyweights 16 move into initial contact with the output shell 12 the dashpot arrangement B ceases to be displaced because the flyweight movement has stopped and the torque develops rapidly to a maximum value.

Figure 4:
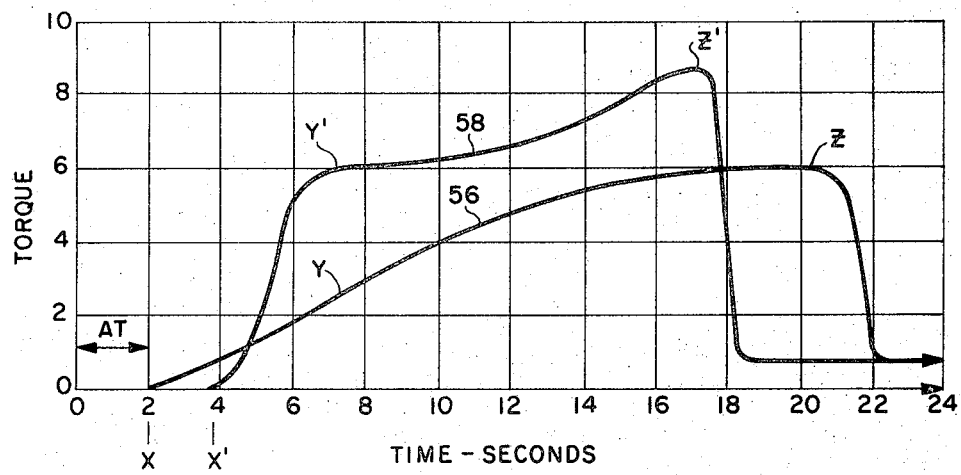
FIG. 4 is a graph showing torque engagement curves of prior art devices with and without torque controlling means.

The torque engaging characteristics of the resilient cushion 40 is shown in the graph of FIG. 4 which illustrates torque engaging curves 56, 58 for a clutch 10 with and without torque controlling means C respectively. In particular curve 58 is shown beginning at X' after a delayed time ΔT' has passed during which the flyweights 16 have moved into initial contact with the output shell 14 as explained above. The torque engaging curve 58 then builds up rapidly to an initial torque engagement value indicated at Y'. Following initial torque engagement, curve 58 gradually increases in torque until maximum torque at Z' occurs which represents full output at zero slip. Theoretically, curve 58 should assume a square wave form because once flyweights 16 make contact with output shell 14, pressure in diaphragm arrangement B will instantaneously drop to zero. However, curve 58 is shown steeply-sloped between its X' and Y' portion and not vertical because of the ballooning distortion of the diaphragm as explained above. Curve 58 is also shown as sloped in a torque-increasing manner between Y' and Z' instead of being theoretically-horizontal and this results from characteristics of the friction lining material, variable dynamic co-efficients of friction, heat, etc.

The effect of the force of the resilient cushion 40 against the centrifugal force of the flyweights 16 is thus readily apparent in curve 56 which shows a gradual application of torque developed. When the flyweights 16 initially contact the output shell 12, the biasing force of the cushion 40 compressed in its second position immediately takes effect and diminishes constantly to produce a curve resembling an inclined straight line. Theoretically the torque developed would appear as an inclined straight line curve. However curve 56 shows a change in slope as it approaches Z, i.e. full output at zero slip, because of the cumulative effect of friction, lining material, heat, etc. as discussed above in relation to the Y'–Z' portion of curve 58.

It should be noted that curves 56 and 58 were developed on a purely inertia test only, with all other variable factors equal. Thus the differences between curves 56, 58 at the X and Z and X' and Z' points respectively are attributed to the effects of resilient cushion 40.

With respect to the operation of the controlled output torque feature of the subject invention, it should be clear that the maximum torque developed by the torque controlling means C can be regulated at any predetermined output by controlling the precompression of the second spring 32 via the control knob 33 so that the second spring 32 is solid after some predetermined expansion of the resilient cushion 40 from its second position has occurred. With the spring 32 solid, or any other solid spacing means substituted for spring 32, the dashpot arrangement B is "solid" and the force developed by resilient cushion 40 opposes the centrifugal force of the flyweights 16 to thus reduce the output torque by a proportionate value.

It is apparent that many modifications may be incorporated in the embodiment illustrated without departing from the spirit or essence of the invention. Thus while the resilient cushion 40 is shown abutting the first diaphragm 27 and pressure sleeve 24, it should be clear that the cushion could satisfactorily function if located anywhere between the dashpot diaphragm 27 and the dovetail portion construction 17 of the cammed hub 20 and flyweights 16. Also conventional steel springs could be substituted for the resilient material of resilient cushion 40 although such springs would not serve as means for dampening vibrations as noted above. Also the dashpot arrangement B illustrated could be of the one-chambered type. Furthermore while a centrifugal clutch has been described in the preferred embodiment, it should be clear that any type of drive mechanism utilizing movement of a driven member to displace a resiliently deformable member for a predetermined period of time before moving into engagement with a driven member can employ the torque controlled means described herein.

It is my intention to include all such modifications and alterations insofar as they come within the scope of the present invention.

It is thus the essence of my invention to provide cushioning means in a time-delayed, frictionally-engaged drive mechanism to control the torque characteristics thereof.

Having thus defined my invention, I claim:

1. In a centrifugally controlled coupling of selectively delayed action comprising a revolvable driving member, a revolvable driven member, an intermediate coupling member revolvable together with said driving member and radially outwardly movable due to centrifugal force into coupling engagement with said driven member, force transmitting means movable longitudinally relative to said driving member in a given direction parallel to the axis of revolution, said force transmitting means being biased towards said intermediate member and having a cam surface in engagement with said intermediate member for applying a radially inward force on said intermediate member, adjustable time-delay means comprising a dampening device having a fluid displacing means operatively connected with said force transmitting means for movement by said force transmitting means in said given direction, said dampening device being provided with a variable volume hydraulic chamber cooperating with said fluid displacing means to receive hydraulic fluid displaced thereby, and adjustment means for adjusting the time flow rate of fluid to said variable volume hydraulic chamber, said improvement comprising:

a resiliently, longitudinally compressible cushion of a molded elastomeric material having a plurality of circumferentially spaced apertures therethrough interposed between said time-delayed means and said force transmitting means, said cushion absorbing the initial longitudinal impact load of said force transmitting means and being compressed by said force transmitting means when said intermediate member moves into initial engagement with said driven member, and said cushion being expanded against the bias of said time-delayed means to exert a gradually decreasing bias through said force transmitting means opposing said centrifugal force of said intermediate coupling member.

2. The centrifugally controlled coupling of claim 1 wherein said adjustable time-delay means further includes solid stop means, said stop means preventing actuation of said fluid displacing means when said cushion is in an expanded position.

3. The coupling of claim 1 wherein said molded elastomeric material is rubber.

* * * * *